Oct. 8, 1940.   E. E. ARNOLD   2,217,464
MAGNETICALLY OPERATED DISK-TYPE BRAKE
Filed Nov. 22, 1938   4 Sheets-Sheet 1

INVENTOR
Edwin E. Arnold.
BY
Paul E. Friedemann
ATTORNEY

Oct. 8, 1940.  E. E. ARNOLD  2,217,464
MAGNETICALLY OPERATED DISK-TYPE BRAKE
Filed Nov. 22, 1938  4 Sheets-Sheet 2

WITNESSES:
E. A. McCloskey.
William J. Ruano

INVENTOR
Edwin E. Arnold.
BY
Paul E. Friedemann
ATTORNEY

Oct. 8, 1940.   E. E. ARNOLD   2,217,464
MAGNETICALLY OPERATED DISK-TYPE BRAKE
Filed Nov. 22, 1938   4 Sheets-Sheet 3

WITNESSES:
E. A. McCloskey.
William J. Ruano

INVENTOR
Edwin E. Arnold.
BY
Paul E. Friedemann
ATTORNEY

Oct. 8, 1940.  E. E. ARNOLD  2,217,464
MAGNETICALLY OPERATED DISK-TYPE BRAKE
Filed Nov. 22, 1938  4 Sheets—Sheet 4

WITNESSES:

INVENTOR
Edwin E. Arnold.
BY
Paul E. Friedemann
ATTORNEY

Patented Oct. 8, 1940

2,217,464

UNITED STATES PATENT OFFICE 2,217,464

MAGNETICALLY OPERATED DISK-TYPE BRAKE

Edwin E. Arnold, Pittsburgh, Pa., assignor to Westinghouse Electric & Manufacturing Company, East Pittsburgh, Pa., a corporation of Pennsylvania Application November 22, 1938, Serial No. 241,762

8 Claims. (Cl. 188—171)

My invention relates to alternating-current and direct-current magnetic disk-type motor brakes, and more especially to those in which a spring supplies the braking pressure and a magnetic structure releases the same.

One object of my invention is to provide an advanced design of motor brake, totally enclosed and fully adjustable and regulatable from the outside.

Another object of my invention is to provide an assembly that is relatively compact and symmetrical axially and that may be readily attached to any standard motor frame by suitable adapter rings.

A further object of my invention is to provide an assembly fully enclosed in a tight casing that may be partially filled with a lubricating, insulating liquid such as oil, thereby greatly aiding in reducing friction and thus wear of the parts as well as aiding in dissipating heat and consequently increasing the capacity for handling large overload. Being tightly enclosed, it excludes dirt and dust from the mechanism and thus operates satisfactorily when submerged in water as may sometimes happen to apparatus of this character.

A still further object of my invention is to provide an assembly which is simple and rugged in construction, thereby giving long service life without frequent adjustment.

A still further object of my invention is to provide an assembly which has a reasonably low cost of manufacture.

Other objects and advantages will become more apparent from a study of the following specification, when considered in conjunction with the accompanying drawings, in which.

Figure 1:
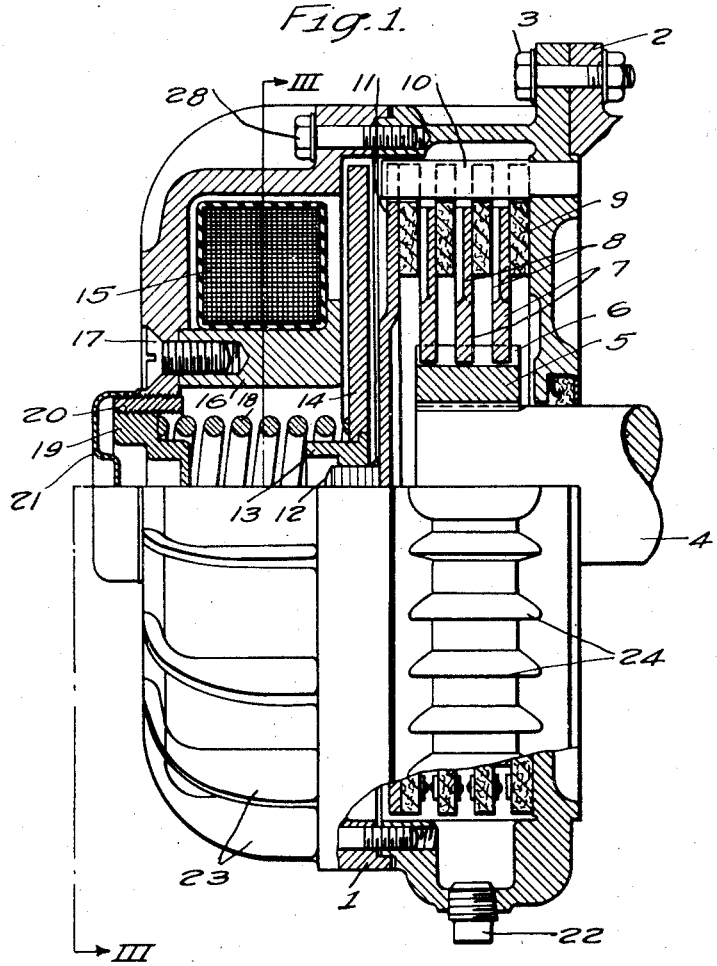
Figure 1 is a view, partly in section, taken on line I—I of Fig. 3, of a direct-current magnetic disk-type motor brake employing certain features of my invention.
Figure 3:
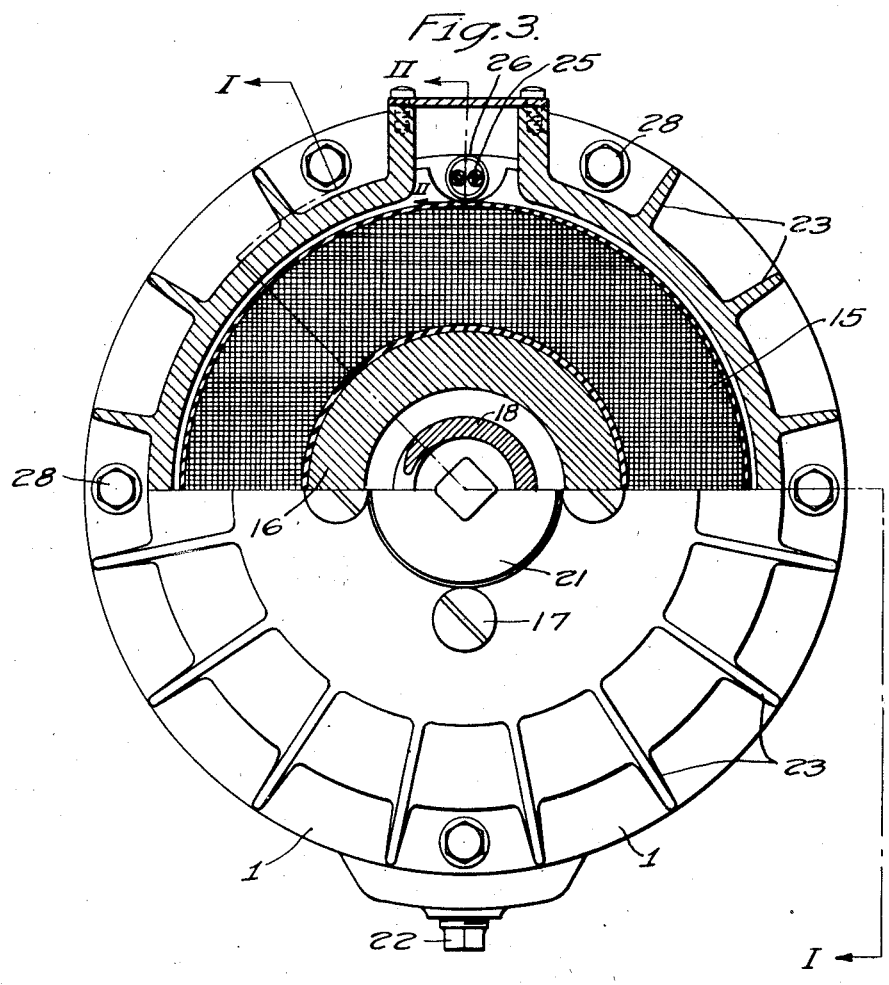
Fig. 3 is a view taken on line III—III of Fig. 1, showing one-half of the brake in section.

Referring more particularly to Figs. 1 and 3 of the drawings, housing 1 of the brake assembly, which is made in two parts held together by bolts 28, may be rigidly attached to a motor housing 2 (shown partly) by any suitable means, such as by bolts 3. Drive shaft 4, of the motor which is to be controlled, is introduced into housing 1. A spider member 5 is keyed to drive shaft 4. By means of a plurality of toothlike projections 6 on spider member 5, it is directly coupled to a plurality of friction rings or disks 7 and at the same time, permits longitudinal movement of friction rings or disks 7 along the axis of the drive shaft. Friction rings or disks 7 are provided with a plurality of grooves 8 to permit circulation of oil or other liquid contained in housing 1 in a radial direction. A plurality of friction rings 9 comprising suitable friction material, such as molded asbestos, are held stationary with respect to housing 1 by means of a member 10 of rectangular cross-section, which project through slots which are located at a plurality of points along the periphery of friction rings 9, thereby allowing longitudinal movement of the friction rings 9, that is, along the axis of the drive shaft 4. To the left of the friction rings is a bearing disc 11 having a threaded projection 12 rigidly attached thereto. Threaded onto projection 12 is an adjusting nut 13 which is surrounded by an armature 14 of a doughnut-shaped magnet 15. Armature 14 may be either relatively movable with respect to nut 13 or welded thereto. The magnet is rigidly secured to the housing by means of the core member 16 and screws 17.

A helical spring 18 has a right end which bears against armature 14, and a left end which bears against a spring tension adjusting nut 19 upon which is threaded a sleeve 20 which, in turn, is threaded to a cap member 21. Each of the adjusting nuts 13 and 19, as well as the cover cap 21, is provided with a socket depression so as to be readily revolvable by a square or flat bar, as may be handy, eliminating the need of special tools therefor. Oil may be introduced into the housing through a threaded plug 22. The circulation of oil within the housing facilitates transfer of heat away from the friction surfaces. It also lubricates the surfaces therefore minimizing wear. Although the friction is reduced by the use of oil this reduction is not serious with respect to the braking qualities of the brake in view of the large surface area of the braking surfaces when supplied with proper pressure. Fins 23 and 24 on the housing also aid to dissipate heat.

Figure 2:
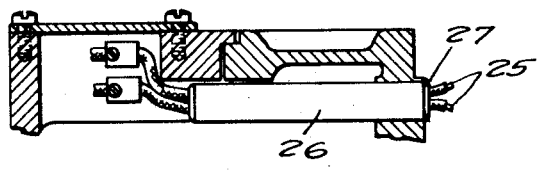
Fig. 2 is a fragmentary cross-sectional view taken on line II—II of Fig. 3, showing a lead-in structure for the wires of the magnet.

In Fig. 2, insulated wires 25 are lead into the housing for the purpose of conducting current to and from the magnetic winding. Wires 25 are introduced through a metal tube lead sheath cable 26 which is soldered at point 27.

The operation of the device is as follows. When it is desired to brake the rotation of drive shaft 4, the magnet coil 15 is deenergized, thereby allowing spring 18 to push against armature 14 which transmits force through members 13 and 12 to disk 11, which disk pushes the annular friction rings 7 and 9 together, thereby causing frictional engagement between stationary rings 9 and rotatable rings 7, thereby restraining spider 5 and shaft 4 from rotation and finally stopping the drive shaft. When it is desired to allow the drive shaft to rotate freely, magnet coil 15 is energized from a suitable source of direct-current energy (not shown) and by electromagnetic action draws armature 14 towards the core 16, overcoming the force of spring 18, thus pulling disk 11 to the left and allowing free relative movement between the stationary friction rings 9 and the rotatable rings 7, thereby allowing shaft 4 to rotate freely.

The adjustments to be made on the brake are as follows:

When it is desired to secure a greater or smaller braking force from spring 18, cap 21 is unscrewed by means of a suitable tool, such as a square or flat bar, which fits into the socket depression, and after the cap is removed and with the same tool fitting into a similar socket depression, adjusting nut 19 is turned clockwise or counter-clockwise, depending on whether more or less spring pressure is desired. In order to adjust for wear of the frictional rings 7—9, so as to restore the original or a desirable air gap between the magnet core 16 and armature 14, cap 21 and adjusting nut 19 are removed and a suitable tool is fitted into the socket depression of adjusting nut 13 and the nut is turned and by means of its threaded relation to member 12, brings member 13 closer to (or, if desired, farther away from) armature 14, thereby adjusting the travel or air gap between core 16 and armature 14. An important feature of the invention resides in the provision of a single spring coaxial with the friction brake rings instead of a plurality of springs spaced about the periphery of the friction brake rings, each of which must be separately adjusted, unequal adjustment of which will cause unequal wear of the friction rings and irregular operation of the brakes. Another important feature is the coaxial arrangement of the adjusting nuts 13 and 19 with respect to the spring and drive shaft, so that while only a single nut will adjust the force of the spring, and another single nut will adjust for wear of the friction surfaces, nevertheless, the adjustment will not cause distortion of either the armature or the disk 11 nor any undesired effect on the spring and any of the other movable members.

Figure 4:
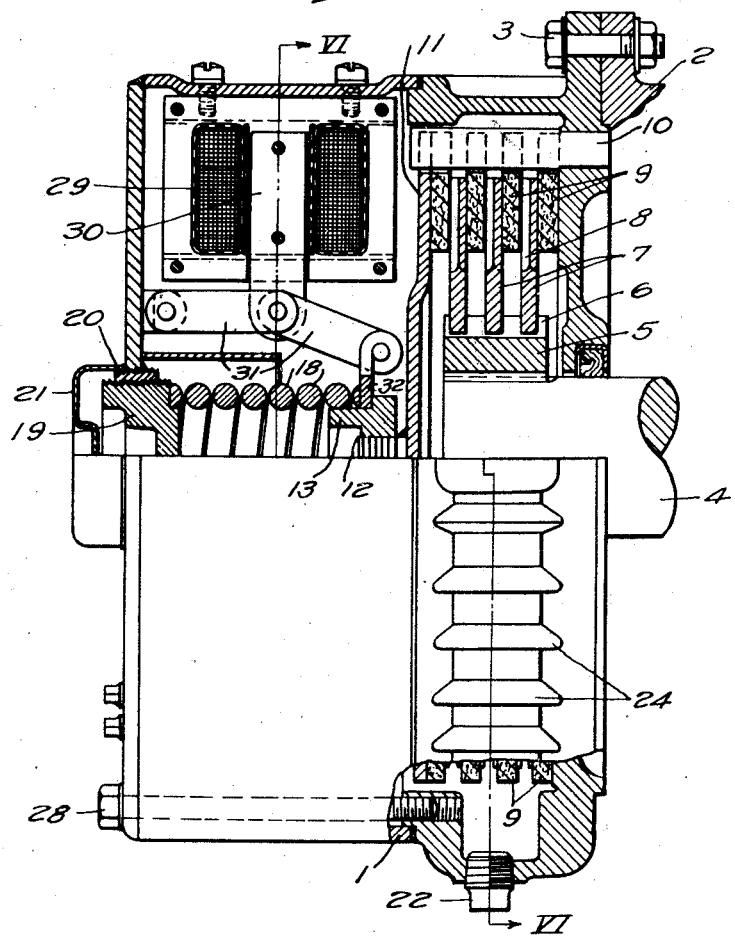
Fig. 4 is a view, partly in section, taken on line IV—IV of Fig. 6, of a modified form of the invention in which alternating current is used.
Figure 5:
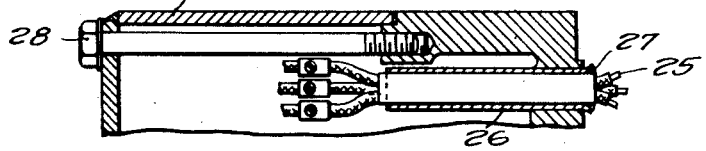
Fig. 5 is a fragmentary cross-sectional view taken on line V—V of Fig. 6, showing a lead-in structure for the wires of the magnet; and, Fig. 6 is a view taken on line VI—VI of Fig. 4, showing one-half of the brake as shown in section.
Figure 6:
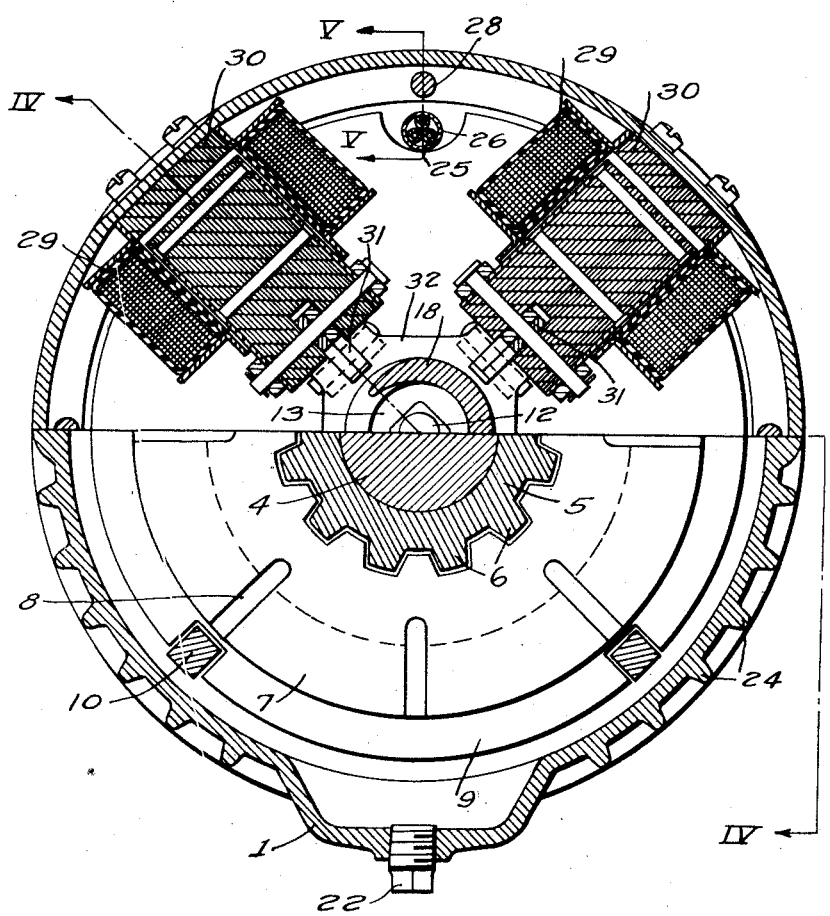

In the modification shown in Figs. 4, 5 and 6, most of the parts are identical with those shown in the arrangement shown in Figs. 1, 2 and 3, such identical parts being denoted by the same reference numerals; hence their description in connection with the discussion of Figs. 4, 5 and 6 is deemed to be unnecessary. The only outstanding difference between the modification shown in Figs. 4–6 and that in Figs. 1–3, is in the electromagnetic operating means. Inasmuch as the assembly shown in Figs. 4–6 is particularly adapted for alternating-current operation, four separate magnetic windings 29 are provided, each having an armature 30 mechanically coupled to a toggle arrangement 31. Separate magnets are used for alternating-current operation because of the facility of laminating the cores and because a greater movement of the armatures can be secured. This greater movement is important since alternating-current magnets are not as powerful as direct-current magnets of the same size therefore they require force amplifying means such as toggles.

Referring to Fig. 4, it will be noted that upon energization of the magnets, the center connection of the toggle will be pulled radially with reference to shaft 4 thus causing ring 32, which is connected to the toggle mechanism, to move to the left relative to nut 13 and thus compressing spring 18. Likewise, when the magnets are deenergized, the spring 18 will push parts 32, 13, 12 and 11 to the right, thereby effecting frictional engagement of the rings 7 and 9.

It should be noted that the brake ring assembly comprising the right half of the housing is the same for either direct-current operation or alternating-current operation, and such right half of the assembly is readily detachable by bolts 28 from the remainder of the assembly and may be attached to an assembly employing either a doughnut-shaped magnet for direct-current operation, or one employing a plurality of magnets and toggles for alternating-current operation. The spring-adjusting device and the wear-adjusting device are likewise the same for either alternating or direct current operation. It should be noted further, that the braking capacity in either modification can be readily changed by merely using a larger or smaller number of braking rings. Obviously, my device may be used as a clutch instead of a brake by merely adapting the housing as the driven member, or by attaching the driven member thereto.

I am, of course, aware that others, particularly after having had the benefit of the teachings of my invention, may devise other forms of braking mechanism embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. In an electro-mechanical coupling mechanism, in combination, a housing, a drive shaft projecting into said housing, means having friction surfaces rotated by said drive shaft, a second means having friction surfaces, means rigidly secured to said housing for restraining said second means from rotational movement with respect to said first means, a disk-like armature, a disk-like member having a screw-threaded projection, an adjusting member threadedly engaging said screw-threaded projection and being operatively engaged by said armature, thereby being adapted to move said armature relatively to said disk-like member, spring means, said screw-threaded projection, adjusting member, spring means and armature being coaxially disposed with respect to said drive shaft, electromagnetic means also coaxially disposed with respect to said screw-threaded projection, adjusting member, spring means and disk-like armature which, upon deenergization releases said armature to permit said spring means, through one end, to force said adjusting member and disk-like armature and disk-like member in one direction to effect frictional engagement between said first and second means, and upon energization and by virtue of the magnetic force of attraction applied to said disk-like armature retracts said spring means in the opposite direction to relieve said frictional engagement between said first and second means.

2. In an electro-mechanical coupling mechanism, in combination, a housing, a drive shaft projecting into said housing, means having friction surfaces rotated by said drive shaft, a second means having friction surfaces, means rigidly secured to said housing for restraining said second means from rotational movement with respect to said first means, a disk-like armature, a disk-like member having a screw-threaded projection, an adjusting member threadedly engaging said screw-threaded projection and being operatively engaged by said armature, thereby being adapted to adjust said armature relatively to said member, spring means, said screw-threaded projection, adjusting member, spring means and armature being coaxially disposed with respect to said drive shaft, electromagnetic means also coaxially disposed with respect to said screw-threaded projection, adjusting member, spring means and armature which, upon deenergization, releases said armature to permit said spring means, through one end, to force said adjusting member and disk-like armature in one direction to effect frictional engagement between said first and second means, and upon energization and by virtue of the magnetic force of attraction applied to said disk-like armature, retracts said spring means in the opposite direction to relieve said frictional engagement between said first and second means, a second adjusting member which engages the other end of said spring means and which is adjustably secured to said housing by means of a screw-threaded connection.

3. In an electro-mechanical coupling mechanism, in combination, a housing, a drive shaft projecting into said housing, means having friction surfaces rotated by said drive shaft, a second means having friction surfaces, means rigidly secured to said housing for restraining said second means from rotational movement with respect to said first means, a disk-like member having a screw-threaded projection, an adjusting member threadedly engaging said screw-threaded projection, thereby being adapted to move relatively thereto, spring means, said screw-threaded projection, adjusting member and spring means being coaxially disposed with respect to said drive shaft, a plurality of magnets each having an armature and a toggle mechanism connected to said armature, which upon deenergization, permits said spring means, through one end, to force said adjusting member and disk-like member in one direction to effect frictional engagement between said first and second means, and upon energization retracts said spring means in the opposite direction to relieve said frictional engagement between said first and second means.

4. In an electro-mechanical coupling mechanism, in combination, a housing, a drive shaft projecting into said housing, means having friction surfaces rotated by said drive shaft, a second means having friction surfaces, means rigidly secured to said housing for restraining said second means from rotational movement with respect to said first means, a disk-like member having a screw-threaded projection, an adjusting member having a non-circular socket depression therein, threadedly engaging said screw-threaded projection, thereby being adapted to move relatively thereto, spring means, said screw-threaded projection, adjusting member and spring means being coaxially disposed with respect to said drive shaft, electromagnetic means also coaxially disposed with respect to said screw-threaded projection, adjusting member and spring means which, upon deenergization, permits said spring means through one end, to force said adjusting member and disk-like member in one direction to effect frictional engagement between said first and second means, and upon energization retracts said spring means in the opposite direction to relieve said frictional engagement between said first and second means.

5. In an electro-mechanical coupling mechanism, in combination, a housing, a drive shaft projecting into said housing, means having friction surfaces rotated by said drive shaft, a second means having friction surfaces, means rigidly secured to said housing for restraining said second means from rotational movement with respect to said first means, a disk-like member having a screw-threaded projection, an adjusting member threadedly engaging said screw-threaded projection, thereby being adapted to move relatively thereto, spring means, said screw-threaded projection, adjusting member and spring means being coaxially disposed with respect to said drive shaft, electromagnetic means concentrically disposed with respect to said friction surfaces, which, upon deenergization permits said spring means, through one end, to force said adjusting member and disk-like member in one direction to effect frictional engagement between said first and second means, and upon energization retracts said spring means in the opposite direction to relieve said frictional engagement between said first and second means, both said adjusting members having sleeve like portions which act as centering means for said spring means and non-circular shaped socket depressions therein.

6. In a brake mechanism, in combination, a plurality of friction disks, spring means for engaging said friction disks and effecting application of the brake, electromagnetic means concentrically disposed with respect to said friction disks for releasing said friction disks, wear take-up means which is circular shaped and concentrically disposed with respect to said friction disks and with said electromagnetic means and which is interposed between said spring means and said friction disks and circular shaped means for adjusting the tension of said spring means which circular shaped means is also concentrically disposed with respect to said friction disks.

7. In a brake mechanism, in combination, a plurality of friction disks, means coaxially disposed with respect to said friction disks, spring means coaxially disposed with said means for normally applying pressure to said means thereby applying the brake, a plurality of magnets having armatures substantially radially disposed with respect to said means, each armature having a toggle which is adapted to operate said first mentioned means and which, upon energization of said magnets, amplifies the magnetic force and transmits it to said spring means so as to release the brake.

8. In a brake mechanism, in combination, a housing, a drive shaft projecting into said housing, means having friction surfaces rotated by said drive shaft, a second means having friction surfaces, means rigidly secured to said housing for restraining said second means from rotational movement with respect to said first means, disk like means coaxially disposed, spring means coaxially disposed with respect to said drive shaft and engaging said disk-like means, a plurality of magnets each having an armature radially disposed with respect to said drive shaft and a toggle mechanism connected to said armature for and connected to transmit moving force to said disk-like means, and which magnets upon deenergization, permit said spring means, through one end, to force said disk-like means in one direction to effect frictional engagement between said first and second means, and upon energization retracts said spring means in the opposite direction to relieve said frictional engagement between the first and second means.

EDWIN E. ARNOLD.